(12) United States Patent
Shin

(10) Patent No.: US 9,819,894 B2
(45) Date of Patent: Nov. 14, 2017

(54) DIGITAL TELEVISION AND CONTROL METHOD THEREOF

(71) Applicant: SAMSUNG ELECTRONICS CO., LTD., Suwon-si (KR)

(72) Inventor: Hyun Jong Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 40 days.

(21) Appl. No.: 14/695,229

(22) Filed: Apr. 24, 2015

(65) Prior Publication Data

US 2016/0065882 A1  Mar. 3, 2016

(30) Foreign Application Priority Data

Sep. 3, 2014 (KR) .................. 10-2014-0116873

(51) Int. Cl.
| | |
|---|---|
| *H04N 5/455* | (2006.01) |
| *H04N 5/50* | (2006.01) |
| *H04N 5/44* | (2011.01) |
| *H04N 5/46* | (2006.01) |
| *H04N 21/438* | (2011.01) |
| *H04N 21/485* | (2011.01) |

(52) U.S. Cl.
CPC ............ *H04N 5/50* (2013.01); *H04N 5/4401* (2013.01); *H04N 5/455* (2013.01); *H04N 5/46* (2013.01); *H04N 21/4384* (2013.01); *H04N 21/485* (2013.01)

(58) Field of Classification Search
CPC .. H04N 21/485; H04N 21/4384; H04N 21/40; H04N 21/4334; H04N 21/26216; H04N 21/4182; H04N 5/455; H04N 5/4401; H04N 5/50; H04N 5/46; H04N 7/002; H04N 7/0884; H04N 7/0887; H04N 7/12; H04N 1/0087; H04N 1/0066; H04N 1/00702; H04N 1/00705; H04N 1/00708; H04N 1/00055; H04N 9/898; H04H 20/38; H04H 40/00
USPC ....... 348/726, 729, 731, 732, 792, 555, 570; 375/228, 324, 340, 343, 344; 725/40, 81, 725/114, 131
See application file for complete search history.

(56) References Cited

U.S. PATENT DOCUMENTS 5,748,226 A * 5/1998 Limberg .................. H04N 5/21
                                                              348/21
6,005,561 A * 12/1999 Hawkins .............. H04N 5/4401
                                                              348/E5.108

(Continued)

FOREIGN PATENT DOCUMENTS

KR    10-2011-0049581 A    5/2011

*Primary Examiner* — Jefferey F Harold
*Assistant Examiner* — Mustafizur Rahman
(74) *Attorney, Agent, or Firm* — Sughrue Mion, PLLC

(57) ABSTRACT

A television and a control method of the television are provided. The control method of the television includes receiving a broadcasting signal, detecting whether a pilot signal is included in the received broadcasting signal, setting a channel of the broadcasting signal as a channel of a first broadcasting format in response to detecting the pilot signal is included in the received broadcasting signal, and setting the channel of the broadcasting signal as a channel of a second broadcasting format in response to detecting that the pilot signal is not included in the received broadcasting signal.

18 Claims, 12 Drawing Sheets

(56) References Cited

U.S. PATENT DOCUMENTS

| | | | |
|---|---|---|---|
| 6,369,857 B1* | 4/2002 | Balaban | H04N 5/46 348/555 |
| 6,539,062 B1* | 3/2003 | Grabb | H04L 27/02 348/E5.003 |
| 7,375,771 B2* | 5/2008 | Naoi | H03J 1/0075 348/731 |
| 8,176,520 B1* | 5/2012 | Mitchell | H04N 7/18 455/552.1 |
| 8,228,441 B2* | 7/2012 | Lee | H04H 20/26 348/731 |
| 8,294,829 B2* | 10/2012 | Takagi | H04N 5/4401 348/732 |
| 8,294,830 B2* | 10/2012 | Furutani | H04H 60/43 348/570 |
| 8,418,209 B1* | 4/2013 | Yang | H04H 20/26 348/552 |
| 2002/0051087 A1* | 5/2002 | Limberg | H04L 1/0057 348/611 |
| 2002/0109793 A1* | 8/2002 | Washino | H03J 7/04 348/735 |
| 2006/0063482 A1* | 3/2006 | Ko | H04H 40/18 455/3.01 |
| 2007/0064835 A1* | 3/2007 | Auranen | H04B 1/525 375/316 |
| 2007/0269184 A1* | 11/2007 | Mizuno | G11B 27/034 386/230 |
| 2008/0181291 A1* | 7/2008 | Zhou | H04B 7/1858 375/227 |
| 2008/0225175 A1* | 9/2008 | Shyshkin | H04N 5/4401 348/572 |
| 2008/0307482 A1* | 12/2008 | Dandekar | H04N 21/235 725/131 |
| 2009/0102981 A1 | 4/2009 | Mody | |
| 2009/0106799 A1* | 4/2009 | Park | H04N 5/44 725/56 |
| 2009/0325499 A1* | 12/2009 | Corke | H04B 17/26 455/67.11 |
| 2010/0017835 A1* | 1/2010 | Wilson | H04H 20/12 725/114 |
| 2010/0056184 A1* | 3/2010 | Vakil | H04W 4/02 455/456.5 |
| 2010/0110305 A1* | 5/2010 | Chou | H04N 5/46 348/726 |
| 2010/0202574 A1* | 8/2010 | Chen | H04L 27/2647 375/343 |
| 2010/0226366 A1* | 9/2010 | Lee | H04H 40/18 370/389 |
| 2010/0310016 A1* | 12/2010 | Okehie | H04L 25/0204 375/340 |
| 2010/0319037 A1* | 12/2010 | Kim | H04N 21/2383 725/81 |
| 2011/0107376 A1 | 5/2011 | Lee et al. | |
| 2011/0149929 A1* | 6/2011 | Kleider | H04L 5/0023 370/338 |
| 2011/0164186 A1* | 7/2011 | Sadek | H04H 20/33 348/724 |
| 2012/0057030 A1* | 3/2012 | Ghosh | H04L 27/0006 348/192 |
| 2012/0123885 A1* | 5/2012 | Shintani | G06Q 30/0251 705/21 |
| 2012/0249887 A1* | 10/2012 | Hr | H04N 5/455 348/726 |
| 2013/0034071 A1* | 2/2013 | Lee | H04W 72/042 370/329 |
| 2013/0145395 A1* | 6/2013 | Jeong | H04N 5/50 725/40 |
| 2013/0278836 A1* | 10/2013 | Funada | H04N 5/50 348/732 |
| 2013/0322511 A1* | 12/2013 | Varma | H04L 27/2689 375/230 |

\* cited by examiner

FIG. 5
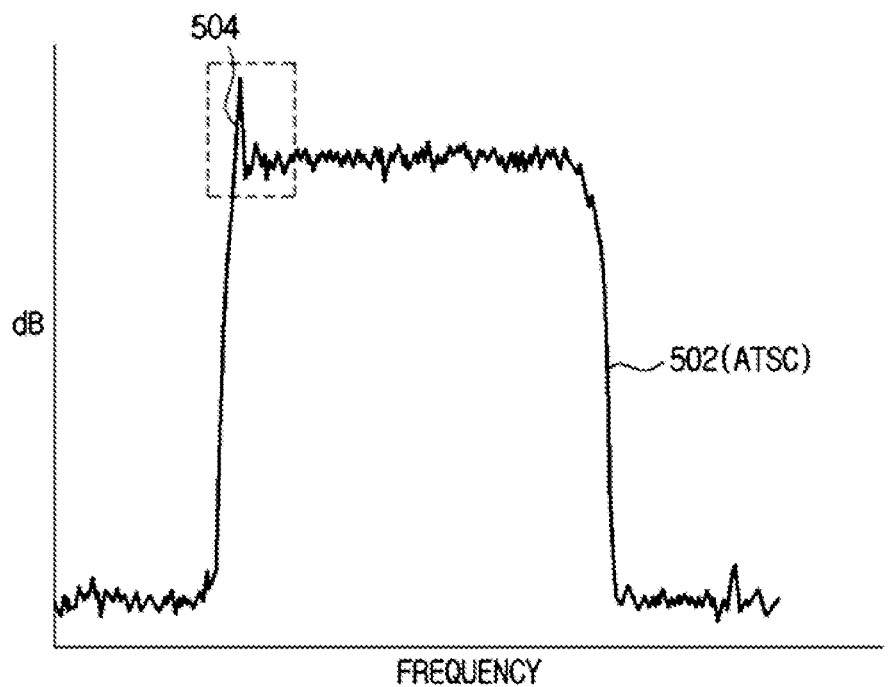
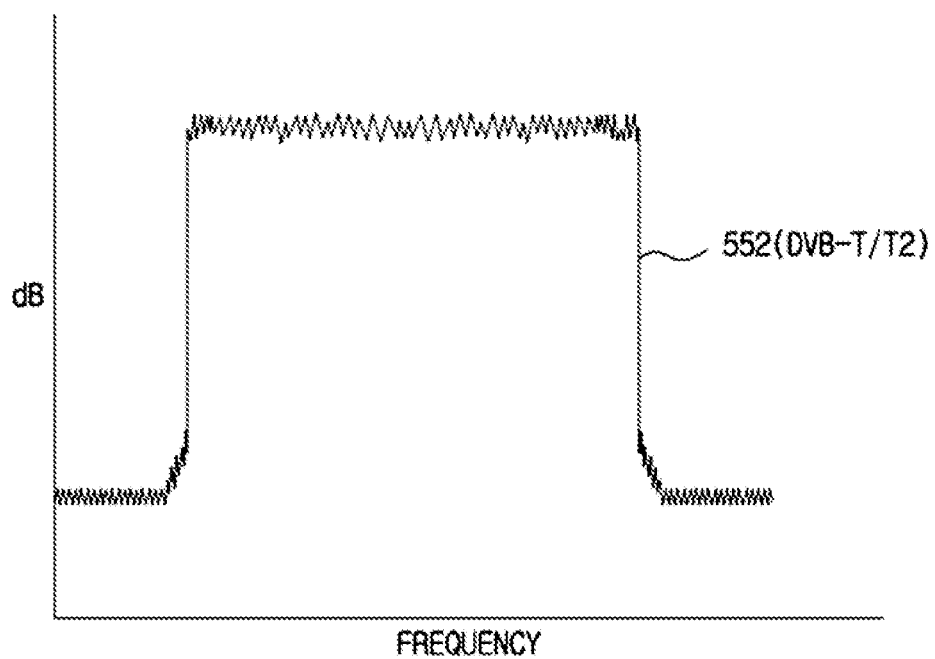

DIGITAL TELEVISION AND CONTROL METHOD THEREOF

CROSS-REFERENCE TO RELATED APPLICATION

This application claims priority from Korean Patent Application No. 10-2014-0116873, filed on Sep. 3, 2014 in the Korean Intellectual Property Office, the disclosure of which is incorporated herein by reference.

BACKGROUND

1. Field

Apparatuses, methods and systems consistent with exemplary embodiments relate to a digital television (DTV) and more particularly, to a channel setting operation of a DTV.

2. Description of the Related Art

Analog televisions utilize analog broadcast signals that effectively limit the size of the display because the poor image quality of the analog broadcast signals becomes more noticeable on as screen size increases. Also, the number of channels allocated for analog broadcasting is limited to about 80 channels. Analog television is also a one-way (uni-directional) medium, which further limits its usefulness. To overcome such limitations of analog televisions, DTVs have become widespread.

The audio/video qualities of the DTVs represent a dramatic improvement over the audio/video qualities of analog televisions. In addition, because digital broadcasting is used to transmit programming to DTVs, there is no interference between adjacent channels that occurs in analog broadcasting, and thus all of the existing unused channels are available. In addition, there is another advantage of digital broadcasting in that digital broadcasting content (video, audio, and data) is transferred, processed, supplied, and saved without loss of the digital broadcasting content. Due to this advantage, the digital broadcasting can provide various convenient services that were not possible with analog broadcasting.

Because of the advantages of digital broadcasting, analog broadcasting systems have converted to digital broadcasting systems in many countries in the world, and analog broadcasting systems are in the process of being converted to digital broadcasting systems in many others.

SUMMARY

One or more exemplary embodiments provide an apparatus and method which shorten a time required for automatic channel setting of a television.

One or more exemplary embodiments also provide an apparatus and method which address an erroneous channel recognition problem due to signal distortion at the time of automatic channel setting of a television.

In accordance with an aspect of an exemplary embodiment, there is provided a control method of a television including: receiving a broadcasting signal; detecting whether a pilot signal is included in the received broadcasting signal; and setting a channel of the broadcasting signal as a channel of a first broadcasting format in response to detecting the pilot signal is included in the received broadcasting signal and setting the channel of the broadcasting signal as a channel of a second broadcasting format in response to detecting that the pilot signal is not included in the received broadcasting signal.

The control method of the television may further include: classifying a channel setting result of the first broadcasting format and a channel setting result of the second broadcasting format and displaying the classified channel setting results in different positions of a screen.

In the control method of the television, the channel setting result of the first broadcasting format may be the number of set channels of the first broadcasting format.

In the control method of the television, the channel setting result of the second broadcasting format may be the number of set channels of the second broadcasting format.

The control method of the television may further include: integrating a channel setting progress of the first broadcasting format and a channel setting progress of the second broadcasting format and displaying a combined channel setting progress indicator.

In the control method of the television, the first broadcasting format may be an Advanced Television Systems Committee (ATSC) broadcasting standard, and the second broadcasting format may be a Digital Video Broadcasting (DVB) broadcasting standard.

In the television control method, the pilot signal may be a pilot signal of an ATSC standard.

In accordance with an aspect of another exemplary embodiment, there is provided a channel setting method of a television, the method: scanning broadcasting signals of a plurality of channels; determining whether a pilot signal is included in each of the broadcasting signals of the plurality of channels; setting a channel of a broadcasting signal that includes the pilot signal among the broadcasting signals of the plurality of channels as a channel of first broadcasting format and setting a channel of a broadcasting signal that does not include the pilot signal among the broadcasting signals of the plurality of channels as a channel of second broadcasting format.

In the channel setting method of the television, reception of the broadcasting signals may include: sequentially receiving the broadcasting signals of the plurality of channels in which different pieces of broadcasting are mixed by scanning the channels.

In the channel setting method of the television, the channel setting of the plurality of channels may be completed during one channel scanning operation.

In the channel setting method of the television, the first broadcasting format may be an ATSC broadcasting format, and the second broadcasting format may be a DVB broadcasting format.

In the television channel setting method, the pilot signal may be a pilot signal of an ATSC format.

In accordance with an aspect of another exemplary embodiment, there is provided a channel setting method of a television including: scanning broadcasting signals of a plurality of channels; determining whether a pilot signal is included in each of the broadcasting signals of the plurality of channels; setting a channel of a broadcasting signal that includes the pilot signal among the broadcasting signals of the plurality of channels as a channel of first broadcasting format and setting a channel of a broadcasting signal that does not include the pilot signal among the broadcasting signals of the plurality of channels as a channel of second broadcasting format; and classifying a channel setting result of the first broadcasting format and a channel setting result of the second broadcasting format and displaying the classified channel setting results in different positions of a screen.

In the channel setting method of the television, the channel setting result of the first broadcasting format may be the number of set channels of the first broadcasting format.

In the channel setting method of the television, the channel setting result of the second broadcasting format may be the number of set channels of the second broadcasting format.

The channel setting method of the television may further include: integrating a channel setting progress of the first broadcasting format and a channel setting progress of the second broadcasting format and displaying a combined channel setting progress indicator.

In the channel setting method of the television, the channel setting progress indicator is indicated by a percentage.

In the channel setting method of the television, the first broadcasting format may be an ATSC broadcasting format, and the second broadcasting format may be a DVB broadcasting format.

In the channel setting method of the television, the pilot signal may be a pilot signal of an ATSC format.

In accordance with an aspect of another exemplary embodiment, there is provided a channel setting method of a television including: scanning broadcasting signals of a plurality of channels; determining whether a pilot signal is included in each of the broadcasting signals of the plurality of channels; determining a broadcasting signal that does not include the pilot signal among the broadcasting signal of the plurality of channels as a broadcasting signal of second broadcasting format and demodulating the broadcasting signal of the second broadcasting format according to a preset second algorithm; setting the channel of the broadcasting signal as a channel of the second broadcasting format when the broadcasting signal is demodulated according to the second algorithm; and determining that setting of a corresponding channel fails when the broadcasting signal is not demodulated according to the second algorithm.

In the channel setting method of the television, the demodulation of the broadcasting signal includes extracting broadcasting data from the broadcasting signal.

In the channel setting method of the television, the first broadcasting format may be an ATSC broadcasting format, and the second broadcasting format may be a DVB broadcasting format.

In the channel setting method of the television, the pilot signal may be a pilot signal of an ATSC format.

In accordance with an aspect of another exemplary embodiment, there is provided a tuner circuit of a television including: a band pass filter configured to extract a preset band of a received broadcasting signal; a frequency conversion unit configured to convert the broadcasting signal of the preset band extracted by the band pass filter into an intermediate frequency (IF) signal; and a pilot detector configured to detect whether a pilot signal is included in the IF signal.

In the tuner circuit of the television, the pilot detector may further detect a frequency of the IF signal.

The tuner circuit of the television may further include an amplifier provided on an output side of the frequency conversion unit and configured to amplify the IF signal, wherein the pilot detector is installed on a transfer path of the IF signal between the frequency conversion unit and the amplifier.

In the tuner circuit of the television, the first broadcasting format may be an ATSC broadcasting format, and the second broadcasting format may be a DVB broadcasting format.

In the tuner circuit of the television, the pilot signal may be a pilot signal of an ATSC standard.

In accordance with an aspect of another exemplary embodiment, there is provided a television including: a tuner circuit configured to receive a broadcasting signal and detect whether a pilot signal is included in the received broadcasting signal; and a controller configured to set a channel of the broadcasting signal as a channel of a first broadcasting format when the pilot signal is detected and set the channel of the broadcasting signal as a channel of a second broadcasting format when no pilot signal is detected.

In the television, the controller may classify a channel setting result of the first broadcasting format and a channel setting result of the second broadcasting format and display the classified channel setting results in different positions of a screen.

In the television, the channel setting result of the first broadcasting format may be the number of set channels of the first broadcasting format.

In the television, the channel setting result of the second broadcasting format may be the number of set channels of the second broadcasting format.

In the television, a channel setting progress of the first broadcasting format and a channel setting progress of the second broadcasting format may be integrated and displayed as a combined channel setting progress indicator.

The television may further include: a demodulation circuit configured to extract broadcasting data by demodulating an IF signal.

In the television, the demodulation circuit may include: a first demodulator configured to demodulate the broadcasting signal of the first broadcasting format; and a second demodulator configured to demodulate the broadcasting signal of the second broadcasting format.

In the television, the first demodulator may be used to demodulate an ATSC broadcasting signal, and the second demodulator may be used to demodulate a DVB broadcasting signal.

In accordance with an aspect of another exemplary embodiment, there is provided an automatic channel setting method of a DTV including: receiving a digital broadcasting signal of each of a plurality of channels; displaying a menu on a screen in response to a signal for calling a main menu; determining whether a pilot signal of an ATSC broadcasting format is included in the broadcasting signal of the each of the plurality of channels in response to selection of the main menu; setting a channel of a broadcasting signal including the pilot signal among broadcasting signals of the plurality of channels as a channel of the ATSC broadcasting format, and performing automatic channel setting for setting a channel of a broadcasting signal that does not include the pilot signal among the broadcasting signals of the plurality of channels as a channel of a DVB broadcasting format; and classifying the number of set channels of the ATSC broadcasting format and the number of set channels of the DVB broadcasting format when the automatic channel setting is completed and displaying the classified numbers in different positions of the screen.

The automatic channel setting method of the DTV may further include integrating a channel setting progress of first broadcasting and a channel setting progress of second broadcasting and displaying a combined channel setting progress indicator.

BRIEF DESCRIPTION OF THE DRAWINGS

The above and/or other aspects will become apparent and more readily appreciated from the following description of exemplary embodiments, taken in conjunction with the accompanying drawings of which:

FIG. 5 is a diagram illustrating a spectrum of each of an ATSC broadcasting signal and a DVB-T/T2 broadcasting signal;

DETAILED DESCRIPTION

Figure 1:
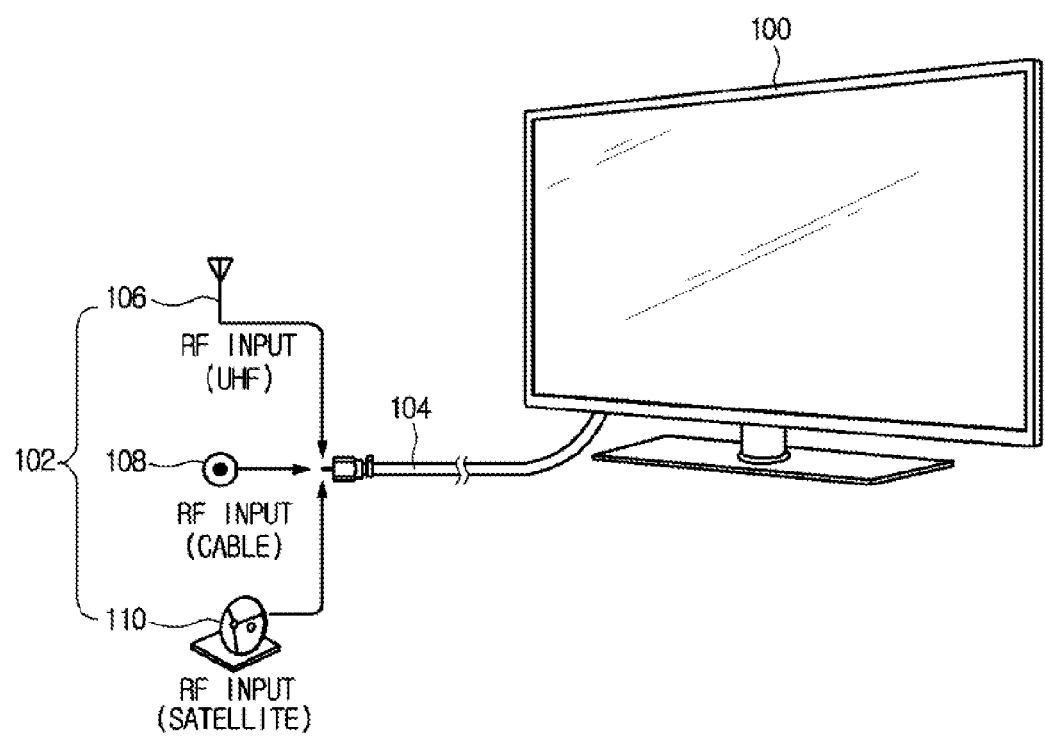
FIG. 1 is a diagram illustrating a DTV according to an exemplary embodiment.

Reference will now be made in detail to exemplary embodiments, aspects of which are illustrated in the accompanying drawings, wherein like reference numerals refer to like elements throughout.

An "analog/digital broadcasting signal," a "digital broadcasting signal," an "analog video signal," a "digital video signal," an "analog audio signal," and a "digital audio signal" described in exemplary embodiments can be understood as follows.

Digital broadcasting refers to a broadcasting system in which broadcasting processes ranging from creation of content to editing, transmission, reception, and reproduction of content can be performed digitally. For example, an amount of data required for digital content can be minimized by compressing video data and audio data using digital signal processing technology such as Moving Picture Experts Group (MPEG)-2 or Audio Codec (AC)-3 in digital broadcasting. An audio signal may also be compressed using digital signal processing technology. After compression, video data and audio data and control information necessary for transmission may be processed into data packets, which can be transmitted through channel coding and modulation processes. Video and audio data may be restored at the receiving side through processes that are inverse to the processes performed at the transmission side. In digital broadcasting, broadcasts may be formatted according to an ATSC broadcasting standard and a DVB broadcasting standard, which are representative digital broadcasting formats. In analog broadcasting, a broadcasting signal is transmitted/received using legacy analog signal processing technology without use of digital signal processing technology in transmission and reception of video and audio signals. There are National Television System Committee (NTSC) broadcasting and Phase Alternating Line (PAL) broadcasting standards as representative analog broadcasting formats. That is, the "analog broadcasting signal" may refer to a signal for transmitting and receiving content of analog broadcasting such as the NTSC broadcasting format and the PAL broadcasting format. The "digital broadcasting signal" may refer to a signal for transmitting and receiving content of a digital broadcasting such as broadcasting signal in the ATSC broadcasting format, the DVB broadcasting format, or other digital broadcasting format.

Regardless of whether the broadcasting type is digital broadcasting or analog broadcasting, the transfer of the signal between a transmitting-side antenna and a receiving-side antenna occurs in an analog form such as a radio frequency (RF) signal form. That is, in digital broadcasting, a transmitting side modulates digital content, converts the modulated digital content into a signal of an analog form, and transmits the signal of the analog form. A receiving side receives the signal of the analog form, demodulates the received signal of the analog form, and converts the demodulated signal back into a digital form. In analog broadcasting, signal processing is mostly performed in an analog scheme. That is, the "analog video signal" may refer to a video signal of an analog form and the "digital video signal" may refer to a video signal of a digital form. In addition, the "analog audio signal" may refer to an audio signal of an analog form and the "digital audio signal" may refer to an audio signal of a digital form.

FIG. 1 is a diagram illustrating a DTV according to an exemplary embodiment. As illustrated in FIG. 1, the DTV 100 according to the embodiment of the present invention is directly connected to an antenna unit 102 through a coaxial cable 104. The antenna unit 102 is used to receive an analog/digital broadcasting signal provided in the form of an RF signal from an analog/digital broadcast content provider. The antenna unit 102 may include a Yagi antenna 106 and a satellite antenna 110. The Yagi antenna 106 may be used to receive a terrestrial broadcasting signal. The satellite antenna 110 may be used to receive a broadcasting signal supplied through a satellite. In addition, the antenna unit 102 may include a cable port 108 connected to a broadcast supply device installed by a cable broadcasting service supplier. The DTV 100 illustrated in FIG. 1 can convert an analog/digital broadcasting signal of an RF signal form received through the antenna unit 102 using a broadcasting signal processor provided inside the DTV 100 and output the converted signal in the form of video and audio through a display and a speaker.

Figure 2:
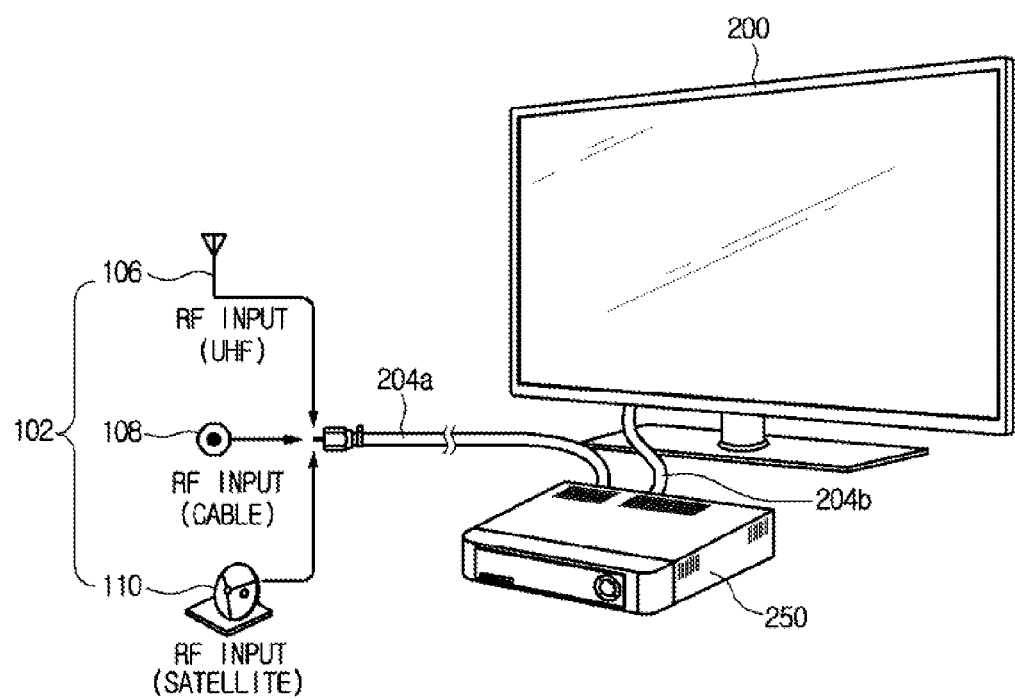
FIG. 2 is a diagram illustrating a DTV according to another exemplary embodiment.

FIG. 2 is a diagram illustrating a DTV according to another exemplary embodiment. As illustrated in FIG. 2, a DTV 200 according to the other embodiment of the present invention is indirectly connected to an antenna unit 202 through a set-top box 250. As a separate independent device, the set-top box 250 is constituted of a broadcasting signal processor provided inside the DTV 200 described with reference to FIG. 1 and is a device provided outside the DTV 200. The antenna unit 102 may include a Yagi antenna 106 and a satellite antenna 110. The Yagi antenna 106 may be used to receive a terrestrial broadcasting signal. The satellite antenna 110 may be used to receive a satellite broadcasting signal supplied through a satellite. In addition, the antenna unit 102 may include a cable port 108 connected to the broadcast supply device installed by the cable broadcast service supplier. After the DTV 200 illustrated in FIG. 2 converts an analog/digital broadcasting signal of the RF signal form received through the antenna unit 202 using a broadcasting signal processor provided inside the DTV 200, the converted signal can be output in the form of video and audio through the display and the speaker.

Figure 3:
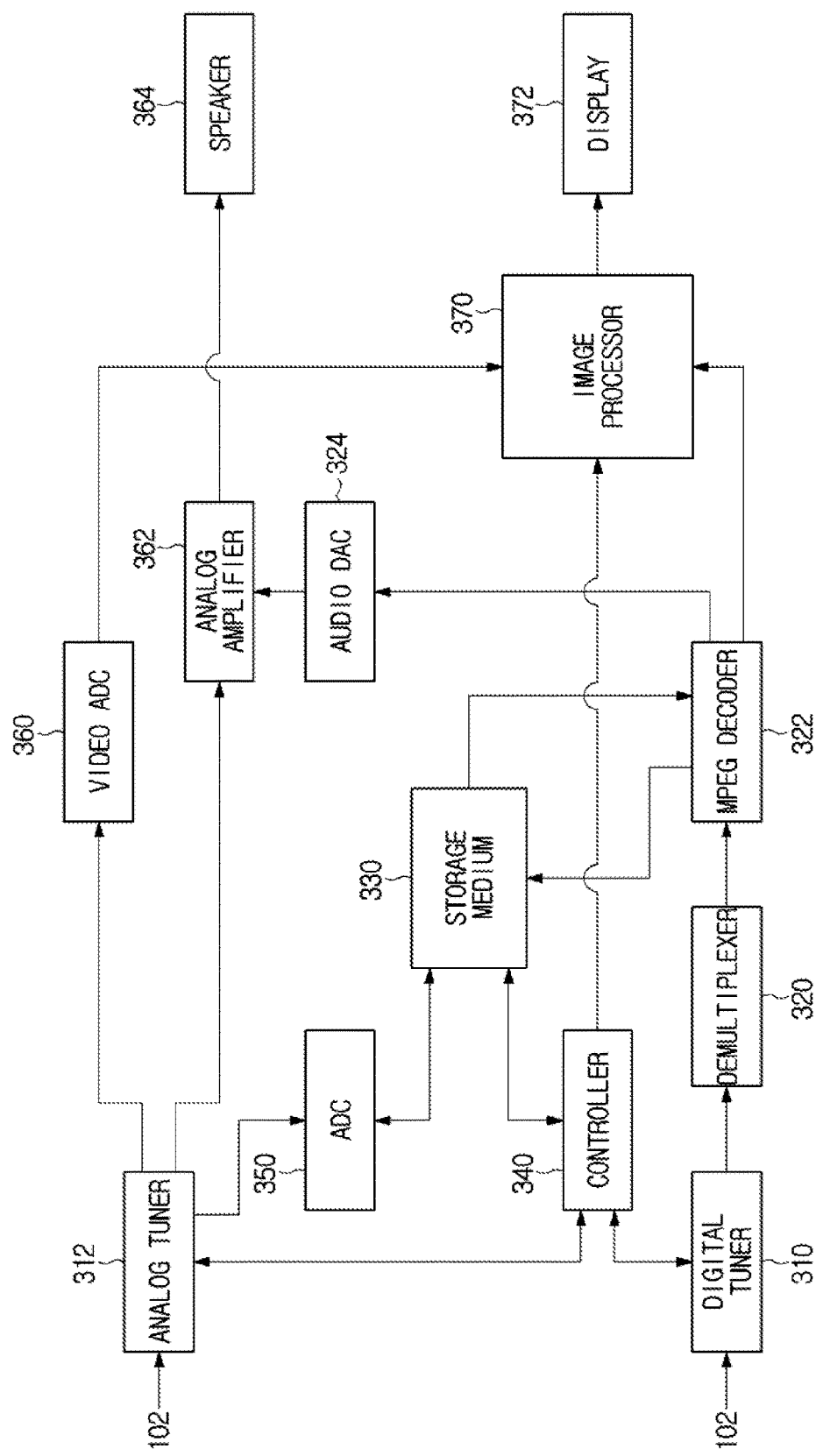
FIG. 3 is a diagram illustrating a configuration of a DTV according to an exemplary embodiment.

FIG. 3 is a diagram illustrating a configuration of a DTV according to an exemplary embodiment. FIG. 3 illustrates a broadcasting signal processor based on constituent elements for signal processing until an analog/digital broadcasting signal is received and the video and audio are output, for example, as the DTV 100 illustrated in FIG. 1. Accordingly, the constituent elements of the DTV 100 according to an exemplary embodiment are not limited to those illustrated in FIG. 3, and the DTV 100 may include other constituent elements for adding functions or improving performance. The DTV 100 illustrated in FIG. 3 is the DTV 100 illustrated in FIG. 1, and represents an embodiment when an analog/digital broadcasting signal is received through the antenna unit 102 and the broadcasting signal processor is embedded in the DTV 100. Even when the broadcasting signal processor 250 like the DTV 200 illustrated in FIG. 2 is externally provided as a device separate from the DTV 200, it is possible to follow a basic process and flow of the analog/digital broadcasting signal as illustrated in FIG. 3.

As illustrated in FIG. 3, the broadcasting signal processor of the DTV 100 according to an exemplary embodiment may include a digital tuner 310, an analog tuner 312, a demultiplexer 320, a storage medium 330, an audio digital-to-analog converter (DAC) 324, an image processor 370, an MPEG decoder 322, a display 372, a video ADC 360, an analog amplifier 362, a speaker 364, an analog-to-digital converter (ADC) 350, and a controller 340. The controller 340 controls the overall operation of the DTV 100. For example, the controller 340 performs the reception of an analog/digital broadcasting signal, performs an automatic channel setting operation of the analog/digital broadcasting received through the analog tuner 312 and the digital tuner 310, and stores an automatic channel setting result.

The broadcasting signal received through the antenna unit 102 may be an analog broadcasting signal and a digital broadcasting signal. The analog broadcasting signal may be either of an NTSC broadcasting signal and a PAL broadcasting signal. The digital broadcasting signal may be a plurality of digital broadcasting signals including an ATSC broadcasting signal. For example, a DVB broadcasting signal may be further received as a digital broadcasting signal other than the ATSC broadcasting signal. The DVB broadcasting signal may be a DVB-T/T2 broadcasting signal. After the analog broadcasting signal and the digital broadcasting signal are demodulated and converted through respective signal processing paths, the demodulated and converted signals may be output through the speaker 364 and the display 372. Here, processing paths of the analog broadcasting signal and the digital broadcasting signal may share some of the constituent elements illustrated in FIG. 3. In the exemplary embodiment of the DTV 100 illustrated in FIG. 3, both the digital tuner 310 and the analog tuner 312 are provided to process the digital broadcasting signal and the analog broadcasting signal.

The processing of the analog broadcasting signal may be performed as follows. The analog tuner 312 performs frequency conversion and demodulation on a modulated analog broadcasting signal received through the antenna unit 102. An analog video signal and an analog audio signal are extracted from an analog broadcasting signal by frequency conversion and demodulation performed in the analog tuner 312. After the extracted analog video signal is converted into a digital video signal by the video ADC 360, the digital video signal is transferred to the image processor 370. The image processor 370 converts the digital video signal transferred from the video ADC 360 through a series of processing processes into a signal that can drive the display 372. The display 372 is driven by a signal transferred from the image processor 370 to display video output. The display 372 may be any one of a liquid crystal display (LCD), a plasma display panel (PDP), a digital light processing (DLP) device, or other display. After the analog audio signal is amplified by the analog amplifier 362, the amplified analog audio signal is transferred to the speaker 364. The speaker 364 is driven by the amplified analog audio signal and generates an audio signal output that can be heard by the viewer.

The processing of the digital broadcasting signal may be performed as follows. The digital tuner 310 performs frequency conversion and demodulation on a modulated digital broadcasting signal received through the antenna unit 102. A digital video signal and a digital audio signal are extracted from the digital broadcasting signal according to frequency conversion and demodulation in the digital tuner 310. The demultiplexer 320 separates the digital broadcasting signal into a digital video signal and a digital audio signal. The MPEG decoder 322 decodes the digital video signal and the digital audio signal separated by the demultiplexer 320. The digital video signal decoded by the MPEG decoder 322 is transferred to the image processor 370. The image processor 370 converts the digital video signal transferred from the MPEG decoder 322 through a series of processing processes into a signal that can drive the display 372. The display 372 is driven by the signal transferred from the image processor 370 to display video output. The digital audio signal decoded by the MPEG decoder 322 is converted into an analog signal by the audio DAC 324. After the analog audio signal obtained by the conversion of the DAC 324 is amplified by the analog amplifier 362, the amplified analog audio signal is transferred to the speaker 364. The speaker 364 is driven by the amplified analog audio signal and generates an audio signal output that can be heard by the viewer.

In FIG. 3, the storage medium 330 is used to store a received broadcasting signal. The storage medium 330 may be a digital storage medium including a hard disk drive (HDD), a solid state drive (SSD), a flash memory, a secure digital (SD) memory, and a universal series bus (USB) memory. After the analog video signal and the analog audio signal produced by the frequency conversion and demodulation of the analog tuner 312 are converted into digital signals by the ADC 350, the digital signals may be stored in the storage medium 330. If analog data can be stored in the storage medium 330, digital conversion of the analog video signal and the analog audio signal is not required. In the case of the digital broadcasting signal, the digital video signal and the digital audio signal decoded by the MPEG decoder 322 may be stored in the storage medium 330 without separate digital conversion.

Figure 4:
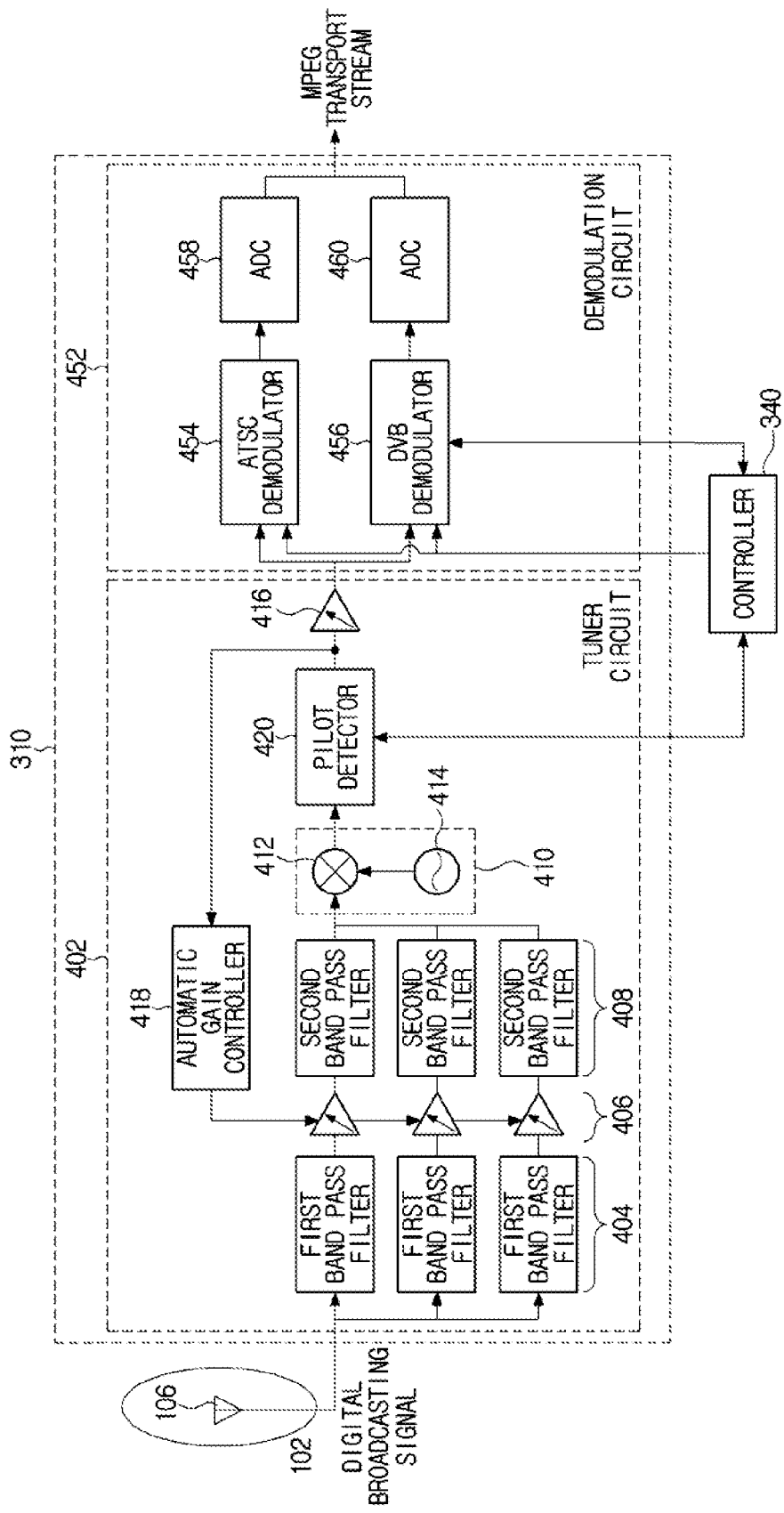
FIG. 4 is a diagram illustrating an exemplary embodiment of a digital tuner of the DTV illustrated in FIG. 1.

FIG. 4 is a diagram illustrating an exemplary embodiment of a digital tuner of the DTV illustrated in FIG. 1. An example of a configuration and operation of the digital tuner 310 when the digital broadcasting signal (for example, ATSC and DVB-T/T2) is received through the antenna unit 102 will be described with reference to FIG. 4. As illustrated in FIG. 4, the digital tuner 310 may include a tuner circuit 402 and a demodulation circuit 452. The tuner circuit 402 converts a digital broadcasting signal of an RF signal form into an IF signal. The demodulation circuit 452 demodulates the IF signal provided from the tuner circuit 402, removes carrier waves, and extracts data.

The digital broadcasting signal received through the antenna unit 102 is a signal in an analog form that includes a signal for digital broadcasting (see the above description of the "analog/digital broadcasting signal," the "analog/digital video signal," and the "analog/digital audio signal" aforementioned in the description of FIG. 1). The digital broadcasting signal in the analog form is converted by the tuner circuit 402. The digital broadcasting signal in the analog form received through the antenna unit 102 is transferred to the frequency conversion unit 410 through a first band pass filter 404, an RF amplifier 406, and a second band pass filter 408 of the tuner circuit 402. The first band pass filter 404 and the second band pass filter 408 are used to pass only a signal of a desired frequency band in a received digital broadcasting signal (or to cut off a signal of an undesired frequency band). The RF amplifier 406 amplifies a magnitude of the digital broadcasting signal passing through the first band pass filter 404 to a fixed magnitude or more. For this, a gain of the RF amplifier 406 can be controlled (see the description of an automatic gain controller 418 as will be described later).

The digital broadcasting signal passing through the second band pass filter 408 is transferred to the frequency conversion unit 410. The frequency conversion unit 410 converts the digital broadcasting signal (RF signal) received through the antenna unit 102 into an IF signal of the digital broadcasting signal of a desired channel. The frequency conversion unit 410 may include a mixer 412 and a local oscillator 414. The local oscillator 414 generates a local oscillation signal of a preset frequency and provides the generated local oscillation signal to the mixer 412. The mixer 412 combines a digital broadcasting signal transferred through the second band pass filter 408 and a local oscillation signal provided from the local oscillator 414 to convert the mixed signal to an IF signal. After the IF signal obtained by conversion of the frequency conversion unit 410 is amplified by the IF amplifier 416, the amplified IF signal is transferred to the demodulation circuit 452. The signal amplification by the IF amplifier 416 is intended to generate a signal of a sufficient magnitude for signal processing in the demodulation circuit 452 connected to a subsequent stage of the tuner circuit 402.

In the tuner circuit 402 of FIG. 4, the automatic gain controller 418 can detect a magnitude (power) of the IF signal obtained by the conversion of the frequency conversion unit 410, and control the gain of the RF amplifier 406 based on the magnitude of the detected IF signal. If the magnitude (power) of the IF signal obtained by the conversion of the frequency conversion unit 410 is excessively small, the gain of the RF amplifier 406 is controlled to be increased. In contrast, if the magnitude (power) of the IF signal obtained by the conversion of the frequency conversion unit 410 is excessively large, the gain of the RF amplifier 406 is controlled to be decreased.

A pilot detector 420 is provided on a signal path between an output side of the mixer 412 of the frequency conversion unit 410 and an input side of the IF amplifier 416. The pilot detector 420 detects preset characteristics of an IF signal while the IF signal output from the frequency conversion unit 410 is transferred to the IF amplifier 416 and transfers a detection result to the controller 340. The controller 340 can perform automatic channel setting based on the detection result. Here, the preset characteristics of the IF signal may be a "frequency" of the IF signal and a "pilot signal having a gain of a preset magnitude." In particular, the pilot signal may be a pilot signal of an ATSC broadcasting signal. The pilot signal of the ATSC broadcasting signal will be described in detail in the description of FIG. 5.

The demodulation circuit 452 removes carrier waves from the amplified IF signal transferred from the tuner circuit 402, extracts data, and generates a transport stream by performing analog-to-digital conversion. The demodulation circuit 452 may include a plurality of demodulators. The demodulation circuit 452 of FIG. 4 includes an ATSC demodulation unit 454 and a DVB demodulator 456. If a digital broadcasting signal of a scheme other than the ATSC broadcasting signal and the DVB broadcasting signal is received through the digital tuner 310, a demodulator associated with the digital broadcasting signal of that other scheme may be further added.

ADCs 458 and 460 may be provided on output sides of the ATSC demodulator 454 and the DVB demodulator 456 provided in the demodulation circuit 452. That is, the ADC 458 is provided on the output side of the ATSC demodulator 454 and converts data of an analog form output from the ATSC demodulator 454 into data of a digital form. The ADC 460 is provided on the output side of the DVB demodulator 456 and converts data of an analog form output from the DVB demodulator 456 into data of a digital form.

Digital broadcasting data output from the ADCs 458 and 460 may conform to an MPEG transport stream format. The MPEG transport stream has a data format for integrating all streams including synchronization of video and audio into one stream so as to reproduce broadcasting content in the DTV. The MPEG transport stream has a data structure that is suitable for an environment in which an error may be easily introduced due to an increase of loss due to noise or the like.

FIG. 5 is a diagram illustrating a spectrum of each of an ATSC broadcasting signal and a DVB-T/T2 broadcasting signal. In FIG. 5, reference numeral 502 of an upper graph indicates a spectrum of ATSC broadcasting signal and reference numeral 552 of a lower graph indicates a spectrum of a DVB-T/T2 broadcasting signal. In FIG. 5, a largest difference between the spectrum 502 of the ATSC broadcasting signal and the spectrum 552 of the DVB-T/T2 broadcasting signal is a pilot signal 504 inserted into the spectrum 502 of the ATSC broadcasting signal. That is, the spectrum 502 of the ATSC broadcasting signal includes the pilot signal 504 having a gain of a preset magnitude. On the other hand, the spectrum 552 of the DVB-T/T2 broadcasting signal does not include a signal such as the pilot signal 504 of the ATSC broadcasting signal.

The ATSC broadcasting signal conforms to an RF modulation format of an ATSC scheme which is a standard format used in American terrestrial digital TV signal transmissions. In the ATSC broadcasting signal, data can be transmitted at a rate of 19.39 Mbps on a 6 MHz channel. A valid transmission rate is 19.28 Mbps. The transmission of the ATSC broadcasting signal may include an error correction encoding process, a synchronization signal insertion process, and an 8 Vestigial Side Band (8-VSB) modulation process. After the synchronization signal insertion is completed, a pilot signal is inserted immediately before the 8-VSB modulation is performed. Reference numeral 504 within a block indicated by the dotted line in the ATSC broadcasting signal spectrum 502 of FIG. 5 indicates the pilot signal of the ATSC broadcasting signal. When a slight direct current (DC) bias voltage (e.g., about 1.25 V) is applied to an 8-VSB baseband signal immediately before performing 8-VSB modulation in the ATSC broadcasting signal, some residual carrier waves appear at a zero (0) frequency point of a modulated spectrum. These residual carrier waves are the pilot signal 504 of the ATSC broadcasting signal. The purpose of pilot signal 504 in the ATSC broadcasting signal facilitates synchronization with an RF phase locked loop (PLL) circuit of a receiver (for example, a digital tuner 310 of FIG. 3) regardless of transmission data. Alternatively, the pilot signal 504 of the ATSC broadcasting signal may be used to perform recovery for a carrier wave error.

The pilot signal 504 of the ATSC broadcasting signal occupies about 7% (0.3 dB) of transmission power. A difference between average power of a data signal of the ATSC broadcasting signal and power of the pilot signal 504 is about 11.3 dB. Accordingly, when a difference between the power of the average data signal of the digital broadcasting signal and the power of the pilot signal 504 is about 11.3 dB received through the digital tuner 310, it can be determined that the corresponding digital broadcasting signal is the ATSC broadcasting signal. The pilot detector 420 shown in the digital tuner 310 of FIG. 4 is used to detect whether the received digital broadcasting signal includes the pilot signal. The controller 340 determines whether the corresponding digital broadcasting signal is the ATSC broadcasting signal or another digital broadcasting signal through a detection result of the pilot detector 420. In addition, the controller 340 controls conversion, demodulation, output, and the like of the digital broadcasting signal according to whether the corresponding digital broadcasting signal is the ATSC broadcasting signal or the other digital broadcasting signal. In particular, the controller 340 is also involved in control of automatic channel setting.

When a digital broadcasting reception environment of the DTV is changed, for example, when a factory initialization is performed on the DTV and the DTV is used for the first time or if it is later re-initialized to a factory state, the digital broadcasting of a corresponding channel can be viewed (received) only after channel information is found and set (registered) by scanning for receivable digital broadcasting channels. A channel setting method may differ according to a module of the DTV. For example, two methods of automatic channel setting and manual channel setting may be provided to set channels of the DTV. In the automatic channel setting, a general channel, a general DTV channel, a cable channel, and a DTV cable channel are collectively automatically set when the user merely selects an automatic channel setting menu in the DTV. When the user already knows each channel number in the manual channel setting, he or she may manually perform channel selection (setting) after switching directly to a corresponding channel using a remote controller or the like.

In a DTV capable of receiving a plurality of different types of general DTV broadcasting (for example, ATSC broadcasting and DVB-T/T2 broadcasting), iterative channel scanning operations equal to number of different types of receivable general DTV broadcasting must be performed to perform automatic channel setting. For example, in the DTV capable of receiving both the ATSC broadcasting and the DVB-T/T2 broadcasting, it is necessary to iterate two channel scanning operations such as channel scanning for the automatic channel setting for channels broadcast in the ATSC broadcasting format and channel scanning for the automatic channel setting for channels broadcast in the DVB-T/T2 broadcasting format so as to perform the automatic channel setting for the general DTV broadcasting. ATSC broadcasting channels and the DVB-T/T2 broadcasting channels are similar in that the channels are general DTV broadcasting channels but they have a different data format and require different signal processing processes. Accordingly, it is necessary to perform the ATSC broadcasting channel setting through one channel scanning operation and perform the DVB-T/T2 broadcasting channel setting through the other channel scanning operation. This means that a time required for the automatic channel setting is increased by the number of types of receivable general DTV broadcasting. Because it is necessary to iterate three or more channel scanning operations if the number of types of general DTV broadcasting capable of being received by the DTV is three or more, a time required for channel setting necessarily increases. Such automatic channel setting of the general DTV will be described below with reference to FIG. 6.

Figure 6:
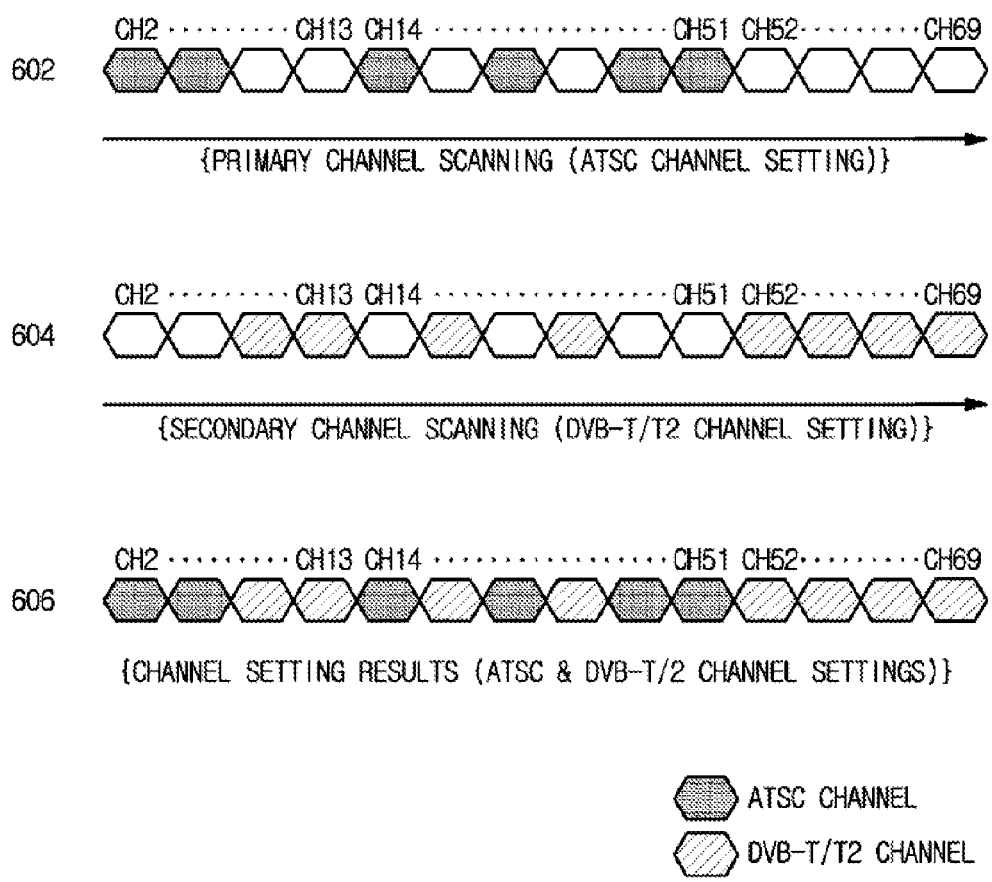
FIG. 6 is a diagram illustrating an exemplary embodiment of an automatic channel setting method in a general DTV capable of receiving a plurality of pieces of general DTV broadcasting.

FIG. 6 is a diagram illustrating an exemplary embodiment of an automatic channel setting method in a general DTV capable of receiving a plurality of pieces of general DTV broadcasting. In FIG. 6, reference numeral 602 denotes the automatic channel setting of one broadcasting format (ATSC broadcasting format) among the plurality of pieces of general DTV broadcasting. In addition, in FIG. 6, reference numeral 604 denotes the automatic channel setting of another broadcasting format (DVB-T/T2 broadcasting format) among the plurality of pieces of general DTV broadcasting. In addition, in FIG. 6, reference numeral 606 denotes an ultimate channel setting result obtained by combining results of the automatic channel settings denoted by reference numerals 602 and 604.

When the target channels for channel scanning are CH2 to CH69 as indicated by reference numeral 602 of FIG. 6, the controller 340 determines whether each channel is an ATSC broadcasting channel while sequentially scanning channels of CH2 to CH69. The controller 340 sets only ATSC broadcasting channels among the scanned channels and skips channels which are not the ATSC broadcasting channels without separate setting (first channel scanning).

Subsequently as indicated by reference numeral 604 of FIG. 6, the controller 340 determines whether each channel is a DVB-T/T2 broadcasting channel while sequentially scanning the channels of CH2 to CH69 again. The controller 340 sets only DVB-T/T2 broadcasting channels among the scanned channels and skips channels which are not the DVB-T/T2 broadcasting channels without separate setting (second channel scanning).

As described above, channel settings for the ATSC broadcasting and the DVB-T/T2 broadcasting may be completed through two channel scanning operations in the automatic channel setting of general DTV channels. If the number of types of general DTV broadcasting is greater than two, then three or more channel scanning operations are necessary and the time required for the automatic channel setting is increased due to the increasing number of channel scanning operations.

Figure 7:
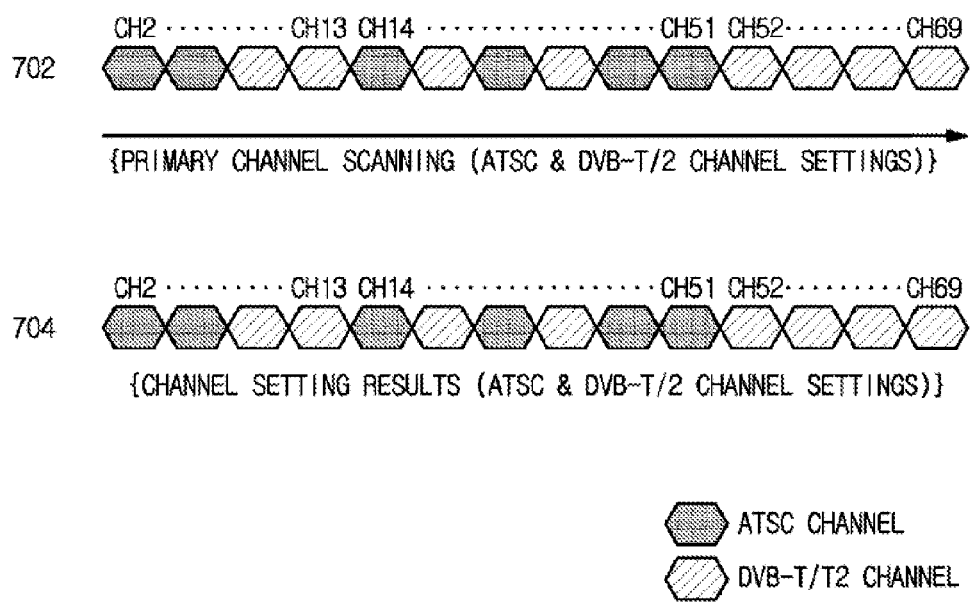
FIG. 7 is a diagram illustrating an automatic channel setting method for a plurality of pieces of general DTV broadcasting in a DTV according to an exemplary embodiment.

FIG. 7 is a diagram illustrating an automatic channel setting method for a plurality of pieces of general DTV broadcasting in a DTV according to an exemplary embodiment. In FIG. 7, reference numeral 702 denotes automatic channel setting of a plurality of pieces of general DTV broadcasting. In addition, in FIG. 7, reference numeral 704 denotes a result of the automatic channel setting denoted by reference numeral 702.

For example, when target channels for channel scanning are CH2 to CH69 as indicated by reference numeral 702 of FIG. 7, the controller 340 determines whether each channel is an ATSC broadcasting channel or a DVB-T/T2 broadcasting channel while sequentially scanning channels from CH2 to CH69. For example, when it is determined that CH51 is an ATSC broadcasting channel during one channel scanning operation, CH51 is immediately set as an ATSC broadcasting channel. Subsequently, when it is determined that CH52, which is the next channel, is the DVB-T/T2 broadcasting channel, CH52 is immediately set as a DVB-T/T2 broadcasting channel. In this manner, the automatic channel setting of all channels broadcast in the ATSC broadcasting format and in the DVB-T/T2 broadcasting format can be completed during only one channel scanning operation (only one channel scanning operation is necessary). The controller 340 stores setting results of ATSC broadcasting channels and DVB-T/T2 broadcasting channels among scanned channels in the storage medium 330 or the like.

In this manner, all automatic channel settings of the ATSC broadcasting and the DVB-T/T2 broadcasting can be completed in only one channel scanning operation in the automatic channel setting of the general DTV broadcasting in the DTV 100 according to an exemplary embodiment. Compared to a process in which the channel settings for ATSC broadcasting and DVB-T/T2 broadcasting are completed through two iterative channel scanning operations in the general DTV described above with reference to FIG. 6, it can be seen that a time required for the automatic channel setting can be significantly shortened because the automatic channel settings of two types of general DTV broadcasting can be completed in only one channel scanning operation in the DTV 100.

The classification of channels broadcast in the ATSC broadcasting format and the channels of the remaining general DTV broadcasting (for example, DVB-T/T2 broadcasting format) excluding the channels broadcast in the ATSC broadcasting format when the general DTV broadcasting channel is set in the DTV 100 according to an exemplary embodiment is based on the identification of the pilot signal 504 shown in the ATSC broadcasting signal spectrum 502 of FIG. 5 described above. For example, while the automatic channel setting of the general DTV broadcasting of the DTV 100 according to an exemplary embodiment is performed, a channel from which the pilot signal 504 as illustrated in FIG. 5 is detected is determined and set to be an ATSC broadcasting channel and a channel from which no pilot signal 504 is detected is determined and set to be a DVB-T/T2 broadcasting channel.

Figure 8:
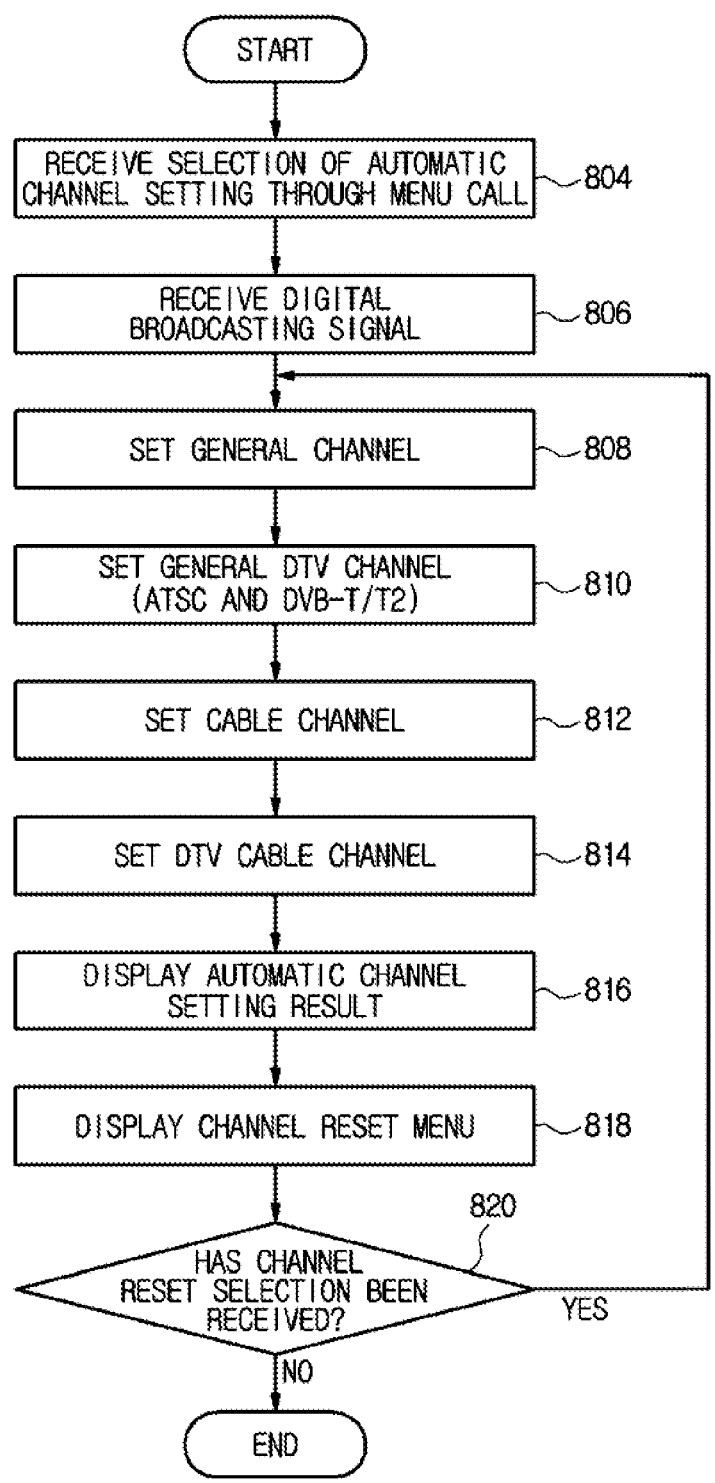
FIG. 8 is a flowchart of an automatic channel setting method of the DTV according to an exemplary embodiment.
Figure 9:
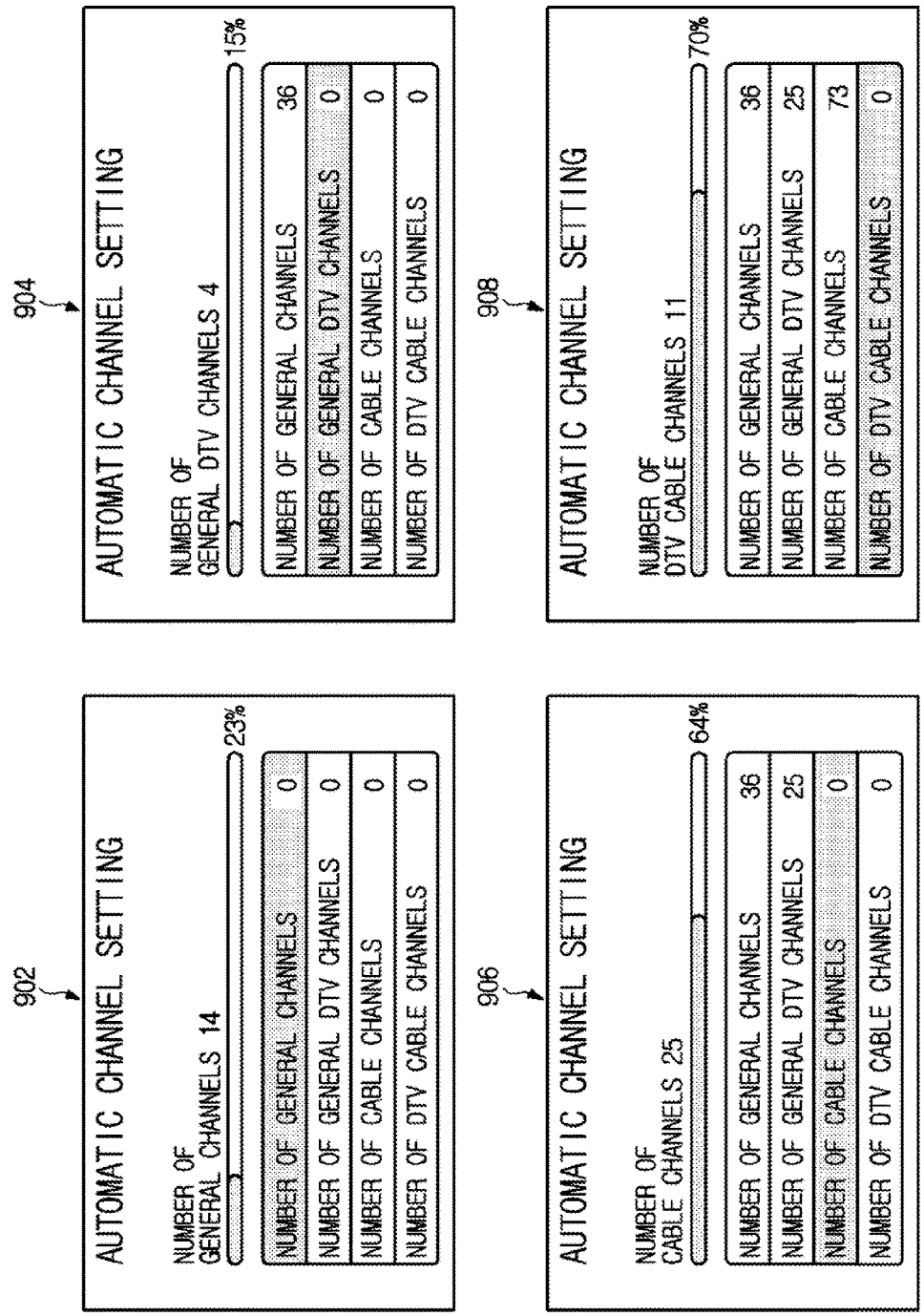
FIG. 9 is a diagram illustrating an automatic channel setting-related user interface capable of being implemented on a screen at the time of automatic channel setting of the DTV according to an exemplary embodiment.

Next, the automatic channel setting method of the DTV according to an exemplary embodiment as described above will be described with reference to FIGS. 8 and 9. FIG. 8 is a flowchart of an automatic channel setting method of the DTV according to an exemplary embodiment, and FIG. 9 is a diagram illustrating an automatic channel setting-related user interface capable of being implemented on a screen at the time of automatic channel setting of the DTV according to an exemplary embodiment.

As illustrated in FIG. 8, the user can turn on the DTV 100 through an operation of an input means such as a remote controller and select a menu item for the automatic channel setting after calling a main menu for the automatic channel setting. The selection of the automatic channel setting through the menu calling can be performed as follows. For example, in response to the operation of the remote controller of the user, the main menu is displayed on the screen of the DTV 100. The user can find a submenu from the main menu displayed on the screen and select a menu item associated with the automatic channel setting. For example, when the user selects a "channel" from the main menu, the automatic channel setting can be configured to be performed in the DTV 100 by selecting "automatic channel setting" from among "automatic channel setting," "manual channel setting," and "channel editing" which are items of the lower menu of the "channel." The user causes the automatic channel setting to be performed in the DTV 100 by selecting the "automatic channel setting" among the items of the lower menu displayed on the screen.

In this manner, the DTV 100 generates a control signal reflecting the selection of the user in the DTV 100 in response to the selection of the user. The controller 340 receives this control signal and prepares control for the automatic channel setting in response to the generation of the control signal (804). For this, the controller 340 first causes a digital broadcasting signal to be received through the antenna unit 102 of the DTV 100 (806). At this time, the received digital broadcasting signal may be a plurality of digital broadcasting signals including an ATSC broadcasting signal and other digital broadcasting signals. For example, the received broadcasting signal may include ATSC broadcasting signals and DVB-T/T2 broadcasting signals.

In the automatic channel setting, "general channel setting 808," "general DTV channel setting 810," "cable channel setting 812," and "DTV cable channel setting 814" are sequentially performed. A target and order of the automatic channel setting are not limited thereto, and the target of the automatic channel setting is added or subtracted, or the order can be changed. In the DTV 100 according to an exemplary embodiment, automatic channel settings for the ATSC broadcasting and other general DTV broadcasting (for example, DVB-T/T2) can be performed together through the "general DTV channel setting 810" of the automatic channel setting.

Here, a user interface screen that can be displayed while the automatic channel setting is performed will be described with reference to FIG. 9. That is, while the "general channel setting 808" is performed, a progress indicator (23%) of the general channel setting and the number of currently set general channels (Number of general channels: 14) can be displayed on the screen as indicated by reference numeral 902. In addition, while the "general DTV channel setting 810" is performed, a progress indicator (15%) of the general DTV channel setting and the number of currently set general DTV channels (Number of general DTV channels: 4) can be displayed on the screen as indicated by reference numeral 904. In addition, while the "cable channel setting 812" is performed, a progress indicator (64%) of the cable channel setting and the number of currently set cable channels (Number of cable channels: 25) can be displayed on the screen as indicated by reference numeral 906. In addition, while the "DTV cable channel setting 814" is performed, a progress indicator (70%) of the DTV cable channel setting and the number of currently set cable channels (Number of DTV cable channels: 11) can be displayed on the screen as indicated by reference numeral 908.

Returning to FIG. 8, when the automatic channel setting targeting all channels is completed, the controller 340 displays an automatic channel setting result on the screen and enables the user to recognize the automatic channel setting result (816). In addition, the controller 340 can enable the user to select whether to perform the automatic channel setting again by displaying a channel reset menu on the screen (818). If the user selects a reset option ("YES" in 820), the controller 340 controls the DTV 100 so that the "general channel setting 808," the "general DTV channel setting 810," the "cable channel setting 812," and the "DTV cable channel setting 814" are iterated again. In contrast, when the user does not select the reset option ("NO" in 820), the automatic channel setting ends.

Figure 10:
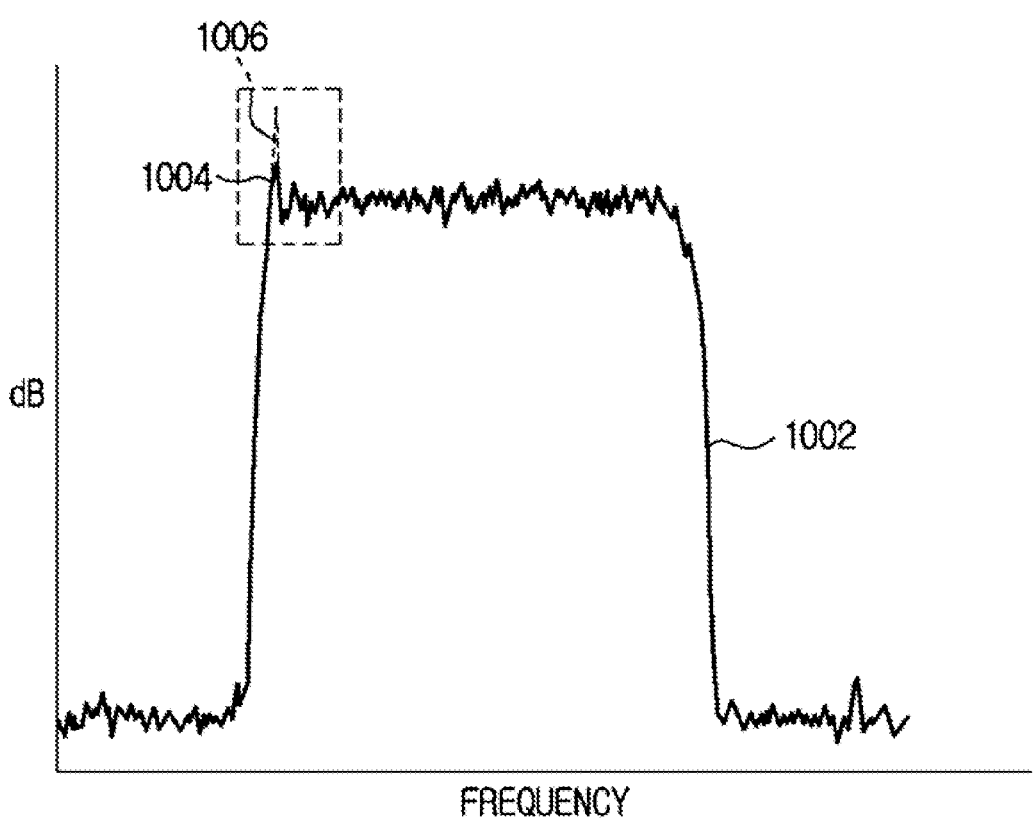
FIG. 10 is a diagram illustrating a spectrum of an ATSC broadcasting signal in which a pilot signal is distorted.

FIG. 10 is a diagram illustrating a spectrum of an ATSC broadcasting signal in which a pilot signal is distorted. A pilot signal 1006 indicated by the dotted line in FIG. 10 has a normal magnitude as in the pilot signal 504 of FIG. 5, and a pilot signal 1004 indicated by the solid line has an abnormal magnitude. Compared to the normal pilot signal 504 included in the spectrum 502 of the ATSC broadcasting signal illustrated in FIG. 5, it can be seen that the magnitude of the distorted pilot signal 1004 of FIG. 10 is significantly smaller.

A process in which the controller 340 classifies the ATSC broadcasting signal and another general DTV broadcasting signal (for example, a DVB-T/T2 broadcasting signal) according to whether the pilot signal 504 included in the ATSC broadcasting signal is detected in the "general DTV channel setting" process indicated by reference numeral 810 of FIG. 8 has been described above. In the "general DTV setting," the controller 340 may not identify the ATSC broadcasting signal and the other general DTV broadcasting signal when a difference between average power of a data signal of an ATSC broadcasting signal and power of the pilot signal 504 is less than 11.3 dB because the pilot signal 1004 included in the ATSC broadcasting signal is less than a magnitude of 7% (0.3 dB) of the transmission power designated as the standard due to the influence of distortion or disturbance as illustrated in FIG. 10. Accordingly, the controller 340 of the DTV 100 according to an exemplary embodiment performs the following control as illustrated in FIG. 11 so as to prevent the ATSC broadcasting channel from being erroneously set as another general DTV broadcasting channel when the ATSC broadcasting signal including the pilot signal 1006 having a magnitude that is outside of a normal range for the pilot signal as defined in the ATSC standard is erroneously recognized as the other general DTV broadcasting signal in the process of the "general DTV channel setting 810" of FIG. 8.

Figure 11:
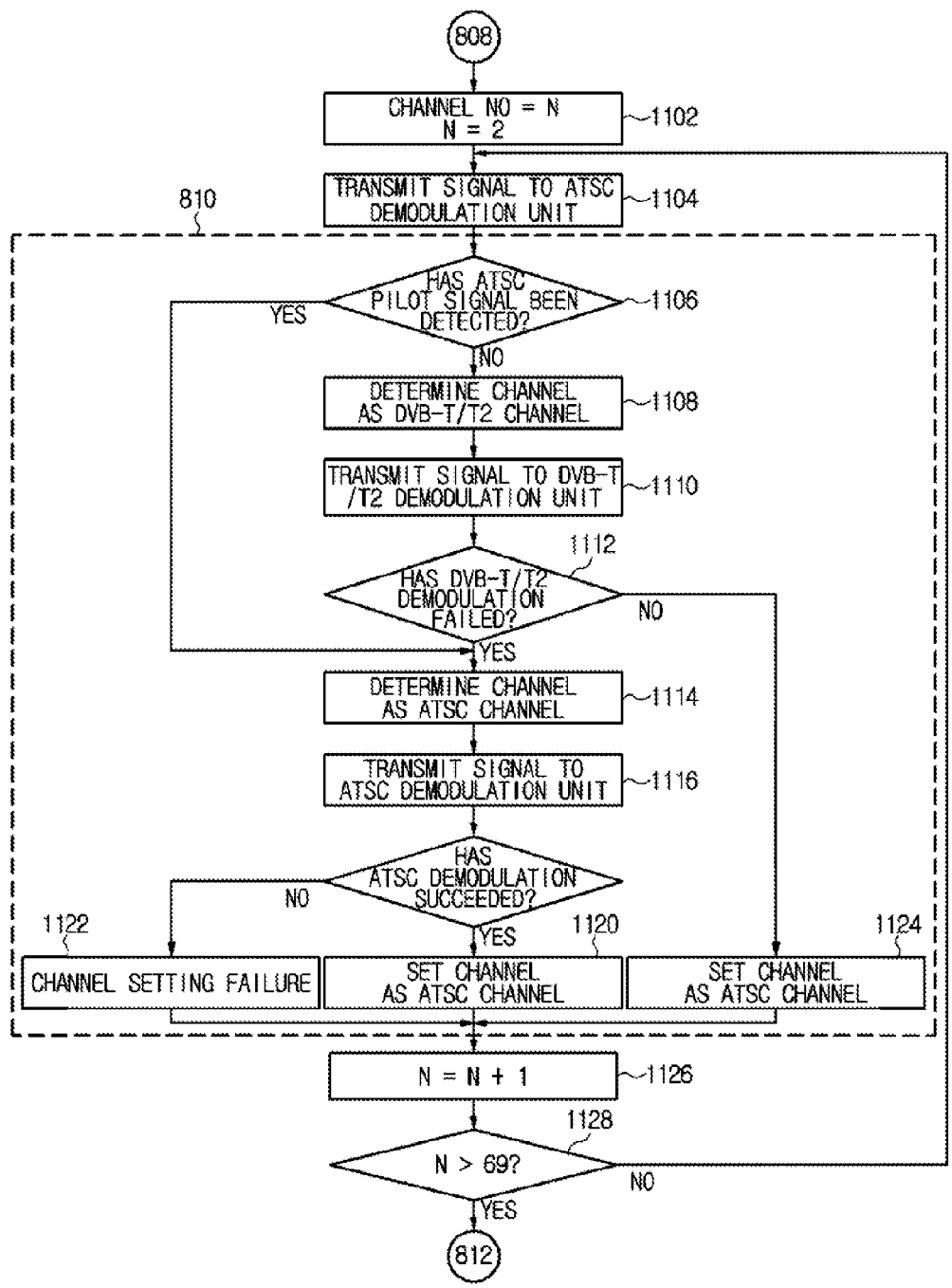
FIG. 11 is a diagram illustrating a control method of "general DTV channel setting" for preventing an error of automatic channel setting according to erroneous recognition of an ATSC broadcasting signal in the DTV according to an exemplary embodiment.

FIG. 11 is a diagram illustrating a control method of "general DTV channel setting" for preventing an error of automatic channel setting according to erroneous recognition of an ATSC broadcasting signal in the DTV according to an exemplary embodiment. A process in which the "general DTV channel setting 810" is performed after the "general channel setting 808" is completed and then the "cable channel setting 812" is performed has been described above with reference to FIG. 8. FIG. 11 is a flowchart of a specific control method of the "general DTV channel setting 810."

As illustrated in FIG. 11, a first channel (for example, CH2 of general DTV broadcasting) of given channels becomes a first target (1102). When a setting target channel is given, filtering, amplification, and frequency conversion are performed by receiving a broadcasting signal of the channel (see the description of the digital tuner 310 of FIG. 4) (1104). The pilot detector 420 detects whether the pilot signal 504 of the ATSC broadcasting signal is included in a broadcasting signal for which the frequency conversion has been completed (1106). A result obtained by detecting whether the pilot signal 504 is included is transferred to the controller 340. The controller 340 determines whether a corresponding broadcasting signal is an ATSC broadcasting signal or a DVB-T/T2 broadcasting signal based on the presence or absence of the pilot signal 504.

If the pilot signal 504 is not detected from the currently received broadcasting signal, the controller 340 determines that the corresponding broadcasting signal is a DVB-T/T2 broadcasting signal (1108). Accordingly, the controller 340 controls a signal path so that the corresponding broadcasting signal is transmitted to the DVB demodulator 456 of the demodulation circuit 452 (1110). The DVB demodulator 456 receiving the broadcasting signal from the tuner circuit 402 causes the DVB broadcasting signal to be demodulated according to the given DVB demodulation algorithm. When the DVB demodulator 456 demodulates the broadcasting signal according to the given DVB demodulation algorithm ("NO" in 1112), the corresponding channel is set as a DVB-T/T2 broadcasting channel because it is evident that the corresponding broadcasting signal is a DVB broadcasting signal (1124).

In contrast, when the DVB demodulator 456 does not successfully demodulate the corresponding broadcasting signal ("YES" in 1112), it is determined that the corresponding broadcasting signal is an ATSC broadcasting signal rather than a DVB broadcasting signal (1114). Accordingly, the controller 340 controls a signal path so that the currently received broadcasting signal is transmitted to the ATSC demodulator 454 (1116). The ATSC demodulator 454 receiving the broadcasting signal from the tuner circuit 402 causes the ATSC broadcasting signal to be demodulated according to the given ATSC demodulation algorithm. When the ATSC demodulator 454 demodulates the broadcasting signal according to a given ATSC demodulation algorithm ("YES" in 1118), the corresponding channel is set as an ATSC broadcasting channel because it is obvious that the corresponding broadcasting signal is an ATSC broadcasting signal (1120).

When the ATSC demodulator 454 does not successfully demodulate the corresponding broadcasting signal ("NO" in 1118), this is the case in which ATSC demodulation also fails in process 1118 on a broadcasting signal for which the DVB demodulation has failed in the previous process 1112. Accordingly, it may be determined that the corresponding broadcasting signal is neither a complete ATSC broadcasting signal nor a complete DVB-T/T2 broadcasting signal. Accordingly, in this case, it is determined that the channel setting fails (1122).

In this manner, when the channel setting for one channel number is completed, channel setting on a general DTV broadcasting signal of the next channel number (N=N+1) is iterated (1126). When channel setting up to CH69, which is the last channel number assigned to the general DTV broadcasting signal, is completed and a condition of N>69 is satisfied ("YES" in 1128), the controller 340 completes the "general DTV channel setting" and switches the process to the process of "cable channel setting 812."

Figure 12:
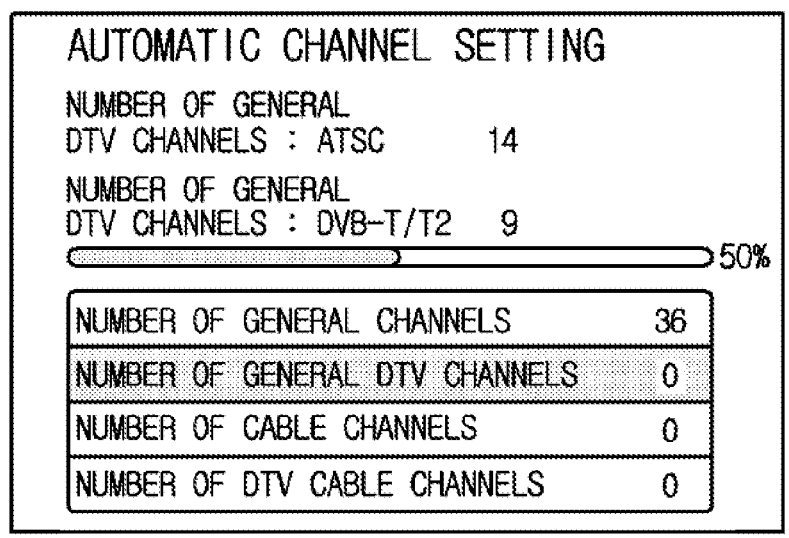
FIG. 12 is a diagram illustrating a user interface of an automatic channel setting method of a DTV according to another exemplary embodiment.

FIG. 12 is a diagram illustrating a user interface of an automatic channel setting method of a DTV according to another exemplary embodiment. Although the total number of channels currently set for the general DTV broadcasting is integrated and displayed as "Number of general DTV channels: 4" as illustrated in FIG. 9, the number of currently set general DTV channels is divided into the number of ATSC channels (for example, "Number of general DTV channels: ATSC 14") and the number of DVB-T/T2 channels (for example, "Number of general DTV channels: DVB-T/T2 9") and the channel numbers are displayed in different positions on the screen in the exemplary embodiment illustrated in FIG. 12. Thereby, the user can separately recognize the number of ATSC channels set as channels of the general DTV broadcasting and the number of DVB-T/T2 channels set as channels of the general DTV broadcasting.

According to one or more of the exemplary embodiments, it is possible to shorten a time required for automatic channel setting of the television and/or solve an erroneous channel recognition problem due to signal distortion at the time of the automatic channel setting of the television.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A control method of a television, the control method comprising:
receiving a broadcasting signal;
detecting whether a pilot signal is included in the received broadcasting signal;
setting a channel corresponding to the received broadcasting signal as a channel of a first broadcasting format in response to detecting the pilot signal is included in the received broadcasting signal;
setting the channel of the broadcasting signal as a channel of a second broadcasting format in response to detecting that the pilot signal is not included in the received broadcasting signal, and
classifying a channel setting result of the first broadcasting format and a channel setting result of the second broadcasting format and displaying the classified channel setting results in different positions of a screen.

2. The control method of the television according to claim 1, wherein the channel setting result of the first broadcasting format is a number of channels set as channels of the first broadcasting format.

3. The control method of the television according to claim 1, wherein the channel setting result of the second broadcasting format is a number of channels set as channels of the second broadcasting format.

4. The control method of the television according to claim 1, further comprising:
displaying a combined channel setting progress indicator that indicates a channel setting progress of the first broadcasting format and the second broadcasting format.

5. The control method of the television according to claim 1,
wherein the first broadcasting format is an Advanced Television Systems Committee (ATSC) broadcasting format, and
wherein the second broadcasting format is a Digital Video Broadcasting (DVB) broadcasting format.

6. The control method of the television according to claim 1, wherein the pilot signal is a pilot signal of an Advanced Television Systems Committee (ATSC) broadcasting format.

7. A channel setting method of a television, the channel setting method comprising:
scanning broadcasting signals of a plurality of channels;
determining whether a pilot signal is included in each of the broadcasting signals of the plurality of channels;
setting a channel corresponding to a broadcasting signal that includes the pilot signal among the broadcasting signals of the plurality of channels as a channel of a first broadcasting format;
setting a channel of a broadcasting signal that does not include the pilot signal among the broadcasting signals of the plurality of channels as a channel of a second broadcasting format, and
classifying a channel setting result of the first broadcasting format and a channel setting result of the second broadcasting format and displaying the classified channel setting results in different positions of a screen.

8. The channel setting method of the television according to claim 7, wherein the scanning of the broadcasting signals comprises:
sequentially receiving the broadcasting signals of the plurality of channels by scanning the plurality of channels.

9. The channel setting method of the television according to claim 8, wherein the channel setting of the plurality of channels is completed during one channel scanning operation.

10. The channel setting method of the television according to claim 7, wherein the first broadcasting format is an Advanced Television Systems Committee (ATSC) broadcasting format, and
wherein the second broadcasting format is a Digital Video Broadcasting (DVB) broadcasting format.

11. The channel setting method of the television according to claim 7, wherein the pilot signal is a pilot signal of an Advanced Television Systems Committee (ATSC) broadcasting format.

12. A television comprising:
a tuner circuit configured to receive a broadcasting signal and detect whether a pilot signal is included in the received broadcasting signal; and
a controller configured to set a channel of the broadcasting signal as a channel of a first broadcasting format in response to the tuner circuit detecting the pilot signal is included in the received broadcasting signal, set the channel of the broadcasting signal as a channel of a second broadcasting format in response to the tuner circuit detecting that the pilot signal is not included in the received broadcasting signal, classify a channel setting result of the first broadcasting format and a channel setting result of the second broadcasting format, and display the classified channel setting results in different positions of a screen.

13. The television to claim 12, wherein the channel setting result of the first broadcasting format is a number of channels set as channels of the first broadcasting format.

14. The television according to claim 12, wherein the channel setting result of the second broadcasting format is a number of channels set as channels of the second broadcasting format.

15. The television according to claim 12, wherein a channel setting progress of the first broadcasting format and a channel setting progress of the second broadcasting format are integrated and displayed as a combined channel setting progress indicator.

16. The television according to claim 12, further comprising:
a demodulation circuit configured to extract broadcasting data by demodulating an intermediate frequency signal.

17. The television according to claim 16, wherein the demodulation circuit comprises:
a first demodulator configured to demodulate the broadcasting signal of the first broadcasting format; and
a second demodulator configured to demodulate the broadcasting signal of the second broadcasting format.

18. The television according to claim 17, wherein the first demodulator is configured to demodulate an Advanced Television Systems Committee (ATSC) broadcasting signal, and
wherein the second demodulator is configured to demodulate a Digital Video Broadcasting (DVB) broadcasting signal.

* * * * *